Aug. 24, 1948.  W. B. LEAF  2,447,511
METHOD OF TREATING WATER
Filed May 2, 1944
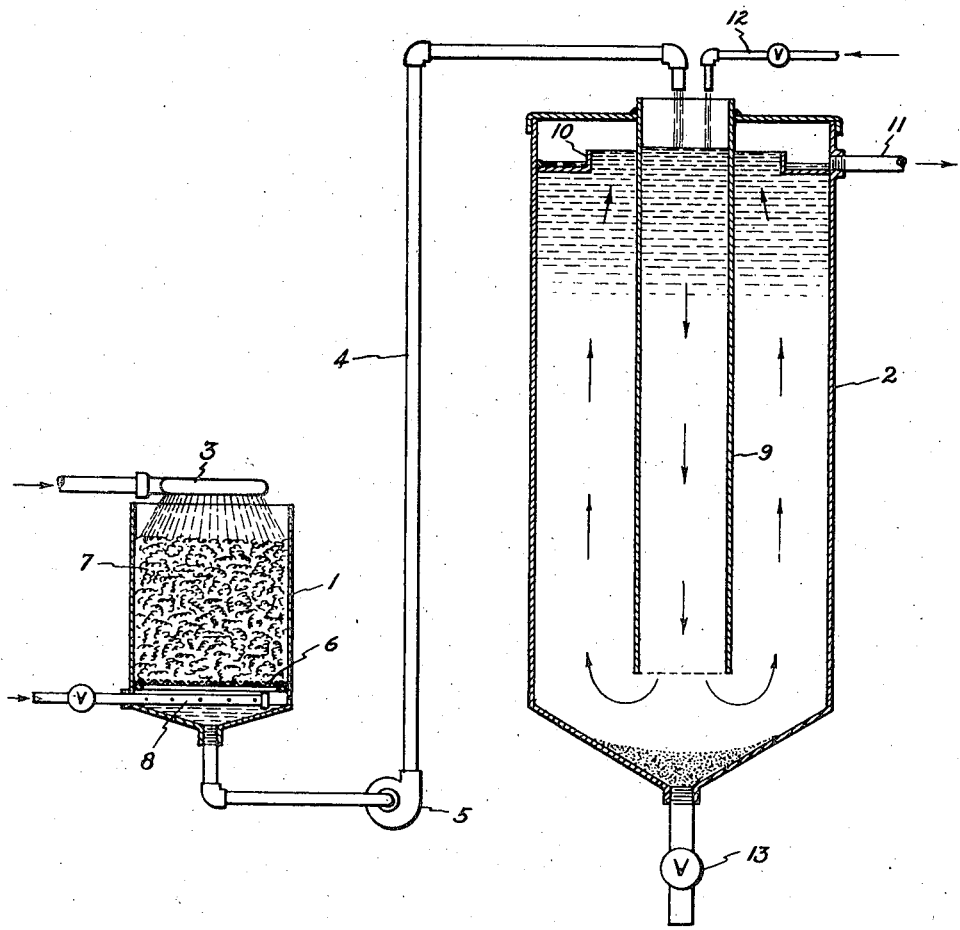
Inventor
Walter B. Leaf;
by *H. A. McGrew*
His Attorney Patented Aug. 24, 1948

2,447,511

UNITED STATES PATENT OFFICE 2,447,511

METHOD OF TREATING WATER

Walter B. Leaf, Denver, Colo.

Application May 2, 1944, Serial No. 533,683

3 Claims. (Cl. 210—16)

My invention relates to methods for removing scale forming ingredients and other impurities from water and particularly to methods for removing silica from water.

Natural waters contain impurities which render them unsatisfactory for use in steam boilers; and it is, therefore, necessary to treat the water to remove the impurities. Hard waters contain dissolved solids including various salts, which upon heating in a boiler may be precipitated and produce a deposit of hard scale on the boiler surfaces which materially impairs the efficiency of the boiler. In addition to the formation of the scale the dissolved substances may cause corrosion of the boiler walls. Various treatments are known for removing most of impurities economically and rendering the water satisfactory for boiler use. When silica is present in the water a very hard and dense scale is formed which has high thermal resistance and is difficult to remove.

In accordance with conventional practice soluble silica is removed from water by adding chemicals which have the property of adsorbing the silica. The compounds normally employed for this purpose are the hydrous oxides or hydroxides of various metals particularly of iron, aluminum and magnesium. These adsorbents may be introduced into the water directly or they may be formed in the water by adding a soluble salt of the metal and a suitable soluble hydroxide. In these silica removal processes it is necessary to add a considerable excess of the adsorbent materials to insure sufficient reduction of the silica content, and the cost of the processes may therefore be high.

It is an object of my invention to provide an improved method for removing silica from water.

It is another object of my invention to provide a method of removing silica from water which is simple, inexpensive, and effective.

Still other objects and advantages of my invention will be apparent from the following description and the features of novelty which characterize my invention will be pointed out with particularity in the claims appended to and forming a part of this specification.

Briefly the method of this invention for removing silica from water includes the use of a mass of scrap material such as metal turnings, boring, and shreddings which provide a large surface area as compared with the volume of metal. Ferrous metals are preferred because they are highly effective and are low in cost; however, other metals such as aluminum, magnesium and zinc may be employed. The water to be treated is caused to flow over the mass of metal and at the same time air or a mixture of air and carbon dioxide is circulated through the mass. A corroding or rusting action takes place and metal hydroxide or hydrous oxides are formed which have the property of adsorbing silica, and the silica content of the water is materially reduced as the water flows over the mass of metal. Soluble iron salts remaining in the water may then be removed by some suitable process such as the "lime and soda" process. The new method herein described also may be employed to produce a coagulated mass or floc which settles by gravity and is suitable for removing solid matter suspended in the water.

The above described process of this invention may be carried out on a commercial scale in suitable apparatus, either built for the purpose, or previously existing apparatus which is modified or adapted for use in carrying out the same. For a better understanding of the present invention, reference is now made to the accompanying drawing, which is a diagram of one form of apparatus, particularly adapted to be utilized in carrying out the method of this invention.

The apparatus illustrated in the accompanying drawing comprises a first treatment tank or bin 1 and a sedimentation or settling tank 2. The water is supplied to the tank 1 from a spray head 3 and is transferred to the tank 2 through a conduit 4 by operation of a pump 5. The first treatment tank has a screen 6 for supporting a mass of treating material 7 above the bottom of the tank, and a pipe 8 is provided for supplying air to the tank below the screen. The tank 2 is a settling tank of the center well type, the water being admitted to a center well 9 and flowing out the bottom of the well and then upwardly to an overflow trough 10 from which it is discharged through an outlet 11. Chemicals for the further treatment of the water may be admitted through a supply pipe 12; and precipitates and sediment settling to the bottom of the tank may be removed through a valved drain 13.

In order to treat water to soften it and remove silica the tank 1 is first filled with a mass of iron or ferrous metal shreddings such as lathe turnings, borings, etc. This mass of metal has a high surface to volume ratio, that is, the surface area of the shreddings is great as compared with their volume. The silica containing water to be treated is then sprayed over the mass from the spray head 3 and flows downwardly toward the bottom of the tank 1. When the water is thus sprayed or trickled over the shreddings rapid rusting takes place in the presence of the air in the tank; and during the rusting process hydrous oxide of iron is formed. This hydrous oxide has the property of adsorbing silica, and the silica content of the water is greatly reduced as it passes over the rusting mass of shreddings. This process of silica removal takes place efficiently at temperatures around 80° F.

In order to accelerate the rusting process, air may be blown into the tank through the supply pipe 8 so that it rises through the treating material. Some further acceleration of the process may be secured by mixing carbon dioxide with the air blown into the tank. In some systems it may be desirable to fill the tank with water and then bubble the air through the water from the pipe 8 to supply the necessary oxygen. When carbon dioxide is present in the tank 1, soluble iron bicarbonate will be formed and will be dissolved in the water leaving the tank.

The next step in the process is to separate the remaining solids whether dissolved or precipitated. The water from the tank 1 is, therefore pumped to the settling tank 2 for further treatment by the addition of chemicals to precipitate the remaining dissolved salts including iron bicarbonate resulting from the rusting action in the first tank. Suitable chemicals for addition at this stage are lime and soda ash which may be added in accordance with the practice employed in the well known "lime and soda" process. Insoluble carbonates are thus precipitated in the settling tank 2 and they, together with any insoluble material coming from the first tank, settle out and form a sludge in the bottom of tank 2. The purified water flows upwardly around the outside of the well 9 to the overflow trough 10 from which it is withdrawn for use through the outlet 11. When no sulphates of calcium or magnesium are dissolved in the water it may be desirable to add only lime to the water in the settling tank in order to precipitate the dissolved bicarbonates.

The addition of lime to the water in the tank 2 when the water contains ferrous bicarbonate precipitates a coagulated mass or floc which settles to the bottom of the tank and carries with it any suspended bodies, such as organic matter, and thereby further purifies the water. This method may therefore be employed when it is desired to remove suspended matter, the water being passed over the ferrous metal shreddings in the presence of air and carbon dioxide in order to form soluble ferrous bicarbonate which is then precipitated as insoluble iron hydroxide by adding calcium hydroxide to the water in the settling tank.

The process of adsorption depends upon the amount and character of the adsorbent material and upon the amount of silica in the water to be treated, and the removal of the silica is on a percentage basis. It may be desirable, therefore, to treat the water in a plurality of steps each including rusting followed by coagulation and sedimentation.

Should an excess of oxygen be dissolved in the water during the spraying process it may be removed by passing the water over a second mass of metal shreddings but in the absence of air.

As the charge of metal in the first treating tank is used up, as may be indicated by a higher silica content in the treated water, the charge is supplemented by a new mass of shreddings introduced into the tank.

While ferrous metals are cheap and easy to obtain, and are very effective in the process, other metals may be employed. Other metals which may be used in the treatment are aluminum, magnesium and zinc, which should be subjected to the presence of air and carbon dioxide in the manner hereinbefore described.

This method provides efficient removal of silica and requires a minimum amount of material to be added to the water. The process is generally as efficient as that in which soluble iron salts and suitable hydroxides are added to precipitate the silica adsorbing hydroxide in the water, and has the advantage of not introducing sodium chloride or sulphate to the water under treatment. Furthermore, the cost of the method of my invention is lower than that of the methods practiced heretofore.

Where the term "air" is used in the specification, it is intended to include any oxygen-containing gas which is capable of performing the function of atmospheric air in this treatment.

What I claim and desire to secure by Letters Patent is:

1. A method of removing silica from silica-containing water which comprises forming a silica adsorbing hydroxide by passing a stream of silica-containing water downwardly over a mass of ferrous metal having a high surface to volume ratio and simultaneously passing a stream of air upwardly over the wetted surfaces of the ferrous metal, separating the treated water solution from the ferrous metal mass, next precipitating ferric compounds from the separated water solution by mixing a coagulant comprising an inorganic, water soluble material from the group consisting of alkali metal and alkaline earth metal hydroxides with the solution, and then separating the solids from the liquid of the resulting aqueous suspension solution.

2. A method of removing silica from silica-containing water which comprises forming a silica adsorbing hydroxide by passing a stream of silica-containing water downwardly over a mass of ferrous metal having a high surface to volume ratio and simultaneously passing a stream of air upwardly over the wetted surfaces of the ferrous metal, separating the treated water solution from the ferrous metal mass, next precipitating ferric compounds from the separated water solution by mixing a coagulant comprising lime with the solution, and then separating the solids from the liquid of the resulting aqueous suspension solution.

3. A method of removing silica from silica-containing water which comprises forming a silica adsorbing hydroxide by passing a stream of silica-containing water downwardly over a mass of ferrous metal having a high surface to volume ratio and simultaneously passing a stream of air upwardly over the wetted surfaces of the ferrous metal, separating the treated water solution from the ferrous metal mass, next precipitating ferric compounds from the separated water solution by mixing soda ash and lime with the solution, and then separating the solids from the liquid of the resulting aqueous suspension solution.

WALTER B. LEAF.

REFERENCES CITED

The following references are of record in the file of this patent:

UNITED STATES PATENTS

| Number | Name | Date |
|---|---|---|
| 458,887 | Devonshire | Sept. 1, 1891 |
| 513,536 | Scowden | Jan. 30, 1894 |
| 564,942 | Sellers | July 28, 1896 |
| 653,740 | Jewell | July 17, 1900 |
| 669,335 | Behrend | Mar. 5, 1901 |
| 677,668 | Koyl | July 2, 1901 |
| 935,637 | Bull | Oct. 5, 1909 |
| 1,108,544 | Bailey et al. | Aug. 25, 1914 |
| 1,196,819 | Snelling | Sept. 5, 1916 |
| 1,428,618 | Wagner | Sept. 12, 1922 |
| 1,590,897 | Lush | June 29, 1926 |
| 1,860,781 | Liebknecht | May 31, 1932 |
| 1,966,733 | Reimers | July 17, 1934 |
| 2,194,524 | Lindsay | Mar. 26, 1940 |
| 2,216,844 | Kuhl | Oct. 8, 1940 |
| 2,267,831 | Liebknecht | Dec. 30, 1941 |
| 2,287,486 | Reichelt et al. | June 23, 1942 |
| 2,307,466 | Noll et al. | Jan. 5, 1943 |

FOREIGN PATENTS

| Number | Country | Date |
|---|---|---|
| 291,435 | Great Britain | July 4, 1929 |